US012687712B2

(12) United States Patent
Jing et al.

(10) Patent No.: US 12,687,712 B2
(45) Date of Patent: Jul. 21, 2026

(54) METHOD FOR OBTAINING AN OPTICALLY-SECTIONED IMAGE OF A SAMPLE, AND A DEVICE SUITABLE FOR USE IN SUCH A METHOD

(71) Applicant: Oxford Nanoimaging Limited, Oxfordshire (GB)

(72) Inventors: Bo Jing, Oxfordshire (GB); Liyana Valiya Peedikakkal, Oxfordshire (GB); Oliver Tedder, Oxfordshire (GB); Matthias Steiner, Oxfordshire (GB)

(73) Assignee: Oxford Nanoimaging Limited, Oxford (GB)

( * ) Notice: Subject to any disclaimer, the term of this patent is extended or adjusted under 35 U.S.C. 154(b) by 378 days.

(21) Appl. No.: 18/010,789

(22) PCT Filed: Jun. 18, 2021

(86) PCT No.: PCT/EP2021/066706
§ 371 (c)(1),
(2) Date: Dec. 15, 2022

(87) PCT Pub. No.: WO2021/255281
PCT Pub. Date: Dec. 23, 2021

(65) Prior Publication Data
US 2023/0236408 A1 Jul. 27, 2023

(30) Foreign Application Priority Data

Jun. 19, 2020 (GB) ..................................... 2009416

(51) Int. Cl.
*G02B 21/00* (2006.01)
*G02B 21/36* (2006.01)
*G01N 21/64* (2006.01)

(52) U.S. Cl.
CPC ....... *G02B 21/367* (2013.01); *G02B 21/0044* (2013.01); *G02B 21/0076* (2013.01); *G01N 21/6458* (2013.01)

(58) Field of Classification Search
CPC .............. G02B 21/367; G02B 21/0044; G02B 21/0076; G02B 21/008; G02B 21/361; G02B 21/0032; G01N 21/6458
See application file for complete search history.

(56) References Cited

U.S. PATENT DOCUMENTS

| | | | |
|---|---|---|---|
| 5,557,113 A | 9/1996 | Moorhouse et al. | |
| 8,570,625 B2 | 10/2013 | Kempe et al. | |
(Continued)

FOREIGN PATENT DOCUMENTS

| | | |
|---|---|---|
| CN | 106068450 A | 11/2016 |
| CN | 107250716 A | 10/2017 |
(Continued)

OTHER PUBLICATIONS

International Search Report and Written Opinion mailed Sep. 24, 2021, in connection with International Application No. PCT/EP2021/066706.

(Continued)

*Primary Examiner* — Mustak Choudhury
(74) *Attorney, Agent, or Firm* — Wolf, Greenfield & Sacks, P.C.

(57) ABSTRACT

A method is presented for obtaining an optically-sectioned image of a sample. The method comprises: providing an illumination beam through an imaging lens such that the illumination beam is focused at a focal plane of the imaging lens; obtaining a plurality of images of the sample. Obtaining comprises providing the illumination beam at a plurality of lateral positions on the focal plane and obtaining each image at each lateral position of the illumination beam, such (Continued)

that an intensity of the illumination beam on a portion of the sample at the focal plane varies for each of the plurality of lateral positions. The method further comprises detecting, using a detector, signals collected via the imaging lens; and constructing the optically-sectioned image based on the plurality of images. The constructing comprises: obtaining a plurality of signal values from the portion of the sample from the plurality of images; evaluating a threshold for the portion; and evaluating a pixel value by integrating a fraction of the plurality of signal values based on the threshold.

20 Claims, 9 Drawing Sheets

(56) References Cited

U.S. PATENT DOCUMENTS

| | | | | |
|---|---|---|---|---|
| 10,330,904 | B2 * | 6/2019 | Kapanidis | ............... G02B 21/26 |
| 10,908,403 | B2 * | 2/2021 | Knop | ...................... G02B 21/06 |
| 2003/0103662 | A1 * | 6/2003 | Finkbeiner | ........... G01N 21/253 |
| | | | | 382/128 |
| 2007/0064990 | A1 | 3/2007 | Roth | |
| 2011/0036996 | A1 | 2/2011 | Wolleschensky et al. | |
| 2013/0107359 | A1 | 5/2013 | Redford | |
| 2017/0322403 | A1 * | 11/2017 | Shroff | ................ G02B 21/0032 |
| 2018/0113292 | A1 | 4/2018 | Novikau et al. | |
| 2019/0355106 | A1 | 11/2019 | Toussaint et al. | |

FOREIGN PATENT DOCUMENTS

| | | |
|---|---|---|
| DE | 10 2008 009216 A1 | 8/2009 |
| EP | 2 535 755 A1 | 12/2012 |
| EP | 3 779 557 A1 | 2/2021 |
| JP | 2016040626 A | 3/2016 |
| KR | 102 104 238 B1 | 4/2020 |
| WO | WO 2004/038483 A1 | 5/2004 |
| WO | WO 2018/140773 A1 | 8/2018 |

OTHER PUBLICATIONS

British Examination Report dated Feb. 23, 2023, in connection with British Application No. GB2009416.5.

Combined Search and Examination Report dated Nov. 16, 2020, in connection with British Application No. GB2009416.5.

Neil et al. Method of obtaining optical sectioning by using structured light in a conventional microscope. Optics Letters. Dec. 15, 1997;22(24):1905-1907.

National Intellectual Search Report dated Sep. 22, 2025, in connection with Application No. 202180050212.9, with English machine translation thereof.

National Intellectual First Review dated Sep. 26, 2025, in connection with Application No. 202180050212.9, with English machine translation thereof.

* cited by examiner

| Illuminating the sample with a patterned illumination beam | 210 |

| Obtaining a plurality of images of the sample by displacing the patterned illumination beam | 220 |

| Evaluating a threshold value for each pixel based on the plurality of images | 230 |

| Constructing an optically sectioned image | 240 |

300

300-1 300-2 300-3 300-4 300-5 300-6 300-7 300-8 300-9 300

1 2 3 4 5 6 7 8 9 10

301

320 arb. unit

322

321

Frame number of the flurescence stack y x

310

311

311

METHOD FOR OBTAINING AN OPTICALLY-SECTIONED IMAGE OF A SAMPLE, AND A DEVICE SUITABLE FOR USE IN SUCH A METHOD

CROSS-REFERENCES TO RELATED APPLICATIONS

This application is a national stage application filed under 35 U.S.C. 371 based on International Patent Application No. PCT/EP2021/066706, filed on Jun. 18, 2021, which claims priority to Great Britain Patent Application No. 2009416.5 filed on Jun. 19, 2020, the disclosures of which are incorporated herein by reference in their entirety.

TECHNICAL FIELD

This specification relates to optical imaging.

BACKGROUND

Optical microscopy of biological samples is limited by out-of-focus light that decreases the image quality and optical contrast. Confocal microscopy addresses this problem of out-of-focus light by using a pinhole in the optical path to reject light from out-of-focus regions of the sample to provide optical sectioning. In confocal microscopy, the choice of the size of the pinhole is crucial to achieve good optical sectioning without overly reducing the amount of collected light from the in-focus plane. For conventional confocal microscopes, the fixed size of pinhole leads to a fixed optical sectioning level and limits the versatility of these microscopes. For example, the optimal size of the pinhole depends on various aspects of the biological sample. Therefore, fixed pinhole size and corresponding fixed degree of optical sectioning level has been one of the limitations of the confocal microscopy.

To overcome the limitation of physical pinholes, alternative sectioning methods based on a combination of structured illumination and post-processing of the recorded images has been suggested by Neil et al. (Optics Letters, 1997, Vol. 22, No. 24, pages 1905-1907). In this approach, a single-spatial-frequency grid pattern is used to illuminate a sample. Three images are taken with the grid displaced at pre-determined distances between images, the distances dictated by the spatial frequency of the grid pattern, with the three images subsequently used to calculate an optically-sectioned image. However, the optical sectioning in this case is inexorably limited by the characteristics of the grid—the spatial frequency dictates not only the way in which imaging is carried out, but also the level of optical sectioning that is achieved. Thus, in the same way that sectioning by confocal microscopy is dictated by the choice of pinhole, sectioning according to the method of Neil et al. is dictated by the choice of grid pattern.

In view of the above, there remains a need for improved methods to produce optically sectioned images.

SUMMARY

According to an aspect of the present invention, there is provided a method for obtaining an optically-sectioned image of a sample. The method comprises: providing an illumination beam through an imaging lens such that the illumination beam is focused at a focal plane of the imaging lens; obtaining a plurality of images of the sample. Obtaining comprises providing the illumination beam at a plurality of lateral positions on the focal plane and obtaining each image at each lateral position of the illumination beam, such that an intensity of the illumination beam on a portion of the sample at the focal plane varies for each of the plurality of lateral positions. The method further comprises detecting, using a detector, signals collected via the imaging lens; and constructing the optically-sectioned image based on the plurality of images. The constructing comprises: obtaining a plurality of signal values from the portion of the sample from the plurality of images; evaluating a threshold for the portion; and evaluating a pixel value by integrating a fraction of the plurality of signal values based on the threshold.

Advantageously, this method allows a variable level of sectioning to be applied to the same set of images post-processing, unlike the method taught in Neil et al. where the sectioning is dictated by the spatial characteristics of the structured illumination. In other words, starting with the same plurality of images, it is possible to vary the degree of sectioning through varying the threshold. Essentially, by changing the threshold the amount of in-focus signal contributing to the final sectioned image can be tuned.

Moreover, the method of the present invention imposes less stringent requirements on the imaging step than Neil et al. where the imaging methodology is again dictated by the spatial characteristics of the structured illumination. For example, the present method is relatively insensitive to the nature of the illumination compared to Neil et al., and imposes less stringent requirements on the imaging system's ability to precisely alter the relative position of the illumination beam and sample between images.

In some implementations, the constructing further comprises: providing a sectioning factor for determining a degree of sectioning of the optically sectioned image. The fraction is evaluated by subtracting a threshold value from each of the plurality of the signal values or by dividing each of the plurality of the signal values by the threshold value.

In some implementations, the threshold value is a function of the threshold and a sectioning factor.

In some implementations, the threshold value is a multiplication of the threshold and a sectioning factor.

In some implementations, the illumination beam is focused at the focal plane, and the illumination beam comprises a periodic pattern with a spatial period defined in at least one direction within the focal plane.

In some implementations, the illumination beam comprises a periodic array of line foci focused at the focal plane.

In some implementations, the illumination beam comprises an array of focused spots focused at the focal plane.

In some implementations, the illumination beam comprises a combination of line foci and focused spots focused at the focal plane.

In some implementations, evaluating the threshold comprises: providing a statistical function; evaluating the threshold by performing the statistical function on the plurality of the signal values. The statistical function receives a plurality of data values and outputs a value based on a skewness of the plurality of the data values.

In some implementations, the statistical function outputs a median of the received plurality of data values such that the threshold is a median of the plurality of signal values.

According to another aspect of the present invention, there is provided a device for obtaining an optically-sectioned image of a sample, the device comprising: an imaging lens; an illumination source configured to provide an illumination beam through the imaging lens such that the illumination beam is focused at a focal plane of the imaging lens; a detector configured to detect signals collected from the sample via the imaging lens; a control unit configured to: obtain a plurality of images of the sample by providing the illumination beam at a plurality of lateral positions on the focal plane, such that an intensity of the illumination beam on a portion of the sample at the focal plane varies for each of the plurality of lateral positions; construct the optically-sectioned image based on the plurality of images by: obtaining a plurality of signal values from the portion of the sample from the plurality of images; evaluating a threshold for the portion; and evaluating a pixel value by integrating a fraction of the plurality of signal values based on the threshold.

In some implementations, the control unit is further configured to: receive a sectioning factor for determining a degree of sectioning of the optically sectioned image; and evaluate the fraction by subtracting a threshold value from each of the plurality of the signal values or by dividing each of the plurality of the signal values by the threshold value.

In some implementations, the threshold value is a function of the threshold and a sectioning factor.

In some implementations, the threshold value is a multiplication of the threshold and a sectioning factor.

In some implementations, the device further comprises a spatial modulator configured to provide the illumination beam focused at the focal plane. The illumination beam comprises a periodic pattern with a spatial period defined in at least one direction within the focal plane.

In some implementations, the illumination beam comprises a periodic array of line foci focused at the focal plane.

In some implementations, the illumination beam comprises an array of focused spots focused at the focal plane.

In some implementations, the illumination beam comprises a combination of line focus and focused spots focused at the focal plane.

In some implementations, the control unit is further configured to: evaluate the threshold by performing a statistical function on the plurality of the signal values. The statistical function receives a plurality of data values and outputs a value based on a skewness of the plurality of the data values.

In some implementations, the statistical function outputs a median of the received plurality of data values such that the threshold is a median of the plurality of signal values.

According to another aspect of the present invention, there is provided a method for obtaining an optically-sectioned image of a sample based on a plurality of images of the sample, the method comprising: obtaining a plurality of signal values from a portion of the sample from the plurality of images; evaluating a threshold for the portion; and evaluating a pixel value by integrating a fraction of the plurality of signal values based on the threshold. The plurality of images comprises optical images of the sample obtained by illuminating the sample with a focused illumination beam at a plurality of lateral positions at a focal plane, each obtained at each lateral position, such that an intensity of the illumination beam on the portion of the sample at the focal plane varies for each of the plurality of lateral positions.

In some implementations, the method further comprises: providing a sectioning factor for determining a degree of sectioning of the optically sectioned image. The fraction is evaluated by subtracting a threshold value from each of the plurality of the signal values by dividing each of the plurality of the signal values by the threshold value.

In some implementations, the threshold value is a function of the threshold and a sectioning factor.

In some implementations, the threshold value is a multiplication of the threshold and a sectioning factor.

In some implementations, evaluating the threshold comprises: providing a statistical function; evaluating the threshold by performing the statistical function on the plurality of the signal values. The statistical function receives a plurality of data values and outputs a value based on a skewness of the plurality of the data values.

In some implementations, the statistical function outputs a median of the received plurality of data values such that the threshold is a median of the plurality of signal values.

BRIEF DESCRIPTION OF THE DRAWINGS

Certain embodiments of the present invention will now be described, by way of examples, with reference to the accompanying drawings, in which.

DETAILED DESCRIPTION

In order to facilitate a variable degree of optical sectioning, the mechanical pinhole needs to be physically changed and the sample needs to be rescanned.

This limits the speed of imaging and may cause sample degradation by, for example, photobleaching or phototoxicity. Furthermore, there is a physical limit to the number of pinholes which can be incorporated in the device.

To overcome the limitation of physical pinholes, alternative methods based on a combination of structured illumination and post-processing of the recorded images have been realised. One such method, as described in Neil et al. (Optics Letters, 1997, Vol. 22, No. 24, pages 1905-1907) works by projecting line patterns onto the sample, then, by shifting the phase of illumination. The method computationally rejects the out-of-focus light. In this configuration, a different level of optical sectioning is achieved by changing the pattern of the illumination and repeated scanning of the sample.

This specification provides a method and a device capable of a continuously adjustable degree of optical sectioning whilst requiring a single set of scans with a fixed hardware implementations, and without the need for prior knowledge of the illumination pattern or calibration of hardware.

Figure 1:
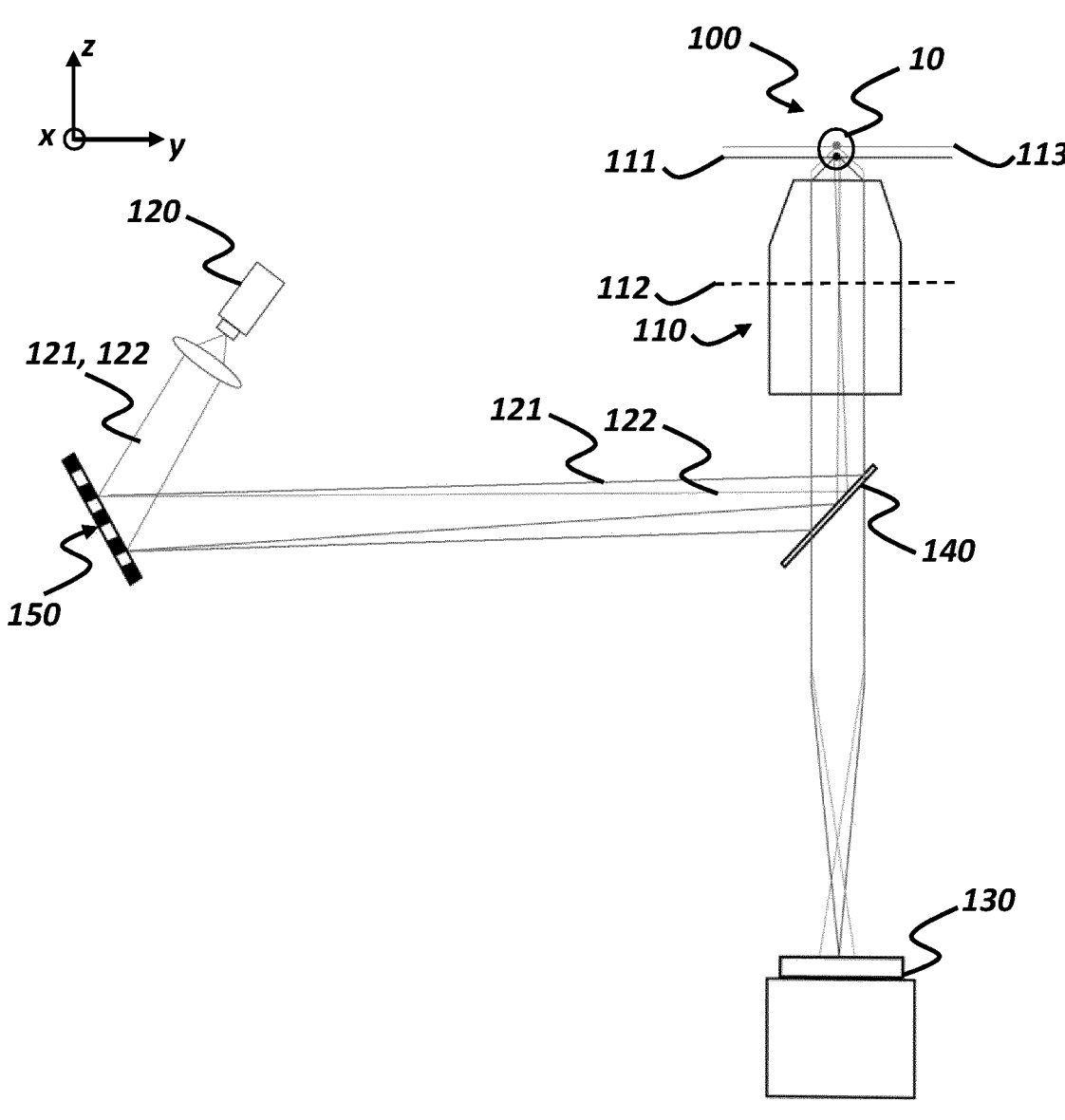
FIG. 1 is a schematic that illustrates an exemplary embodiment of an optical imaging system.

FIG. 1 is a schematic that illustrates an exemplary embodiment of an optical imaging system.

An optical imaging system 100 is configured to optically detect, image and investigate a specimen or a sample or a specimen 10.

The optical imaging system 100 includes an imaging lens 110, an illumination source 120, a detector 130, and an optical element 140.

In some implementations, the optical imaging system 100 may include a spatial light modulator 150.

The illumination source 120 emits an excitation beam 121, 122. The optical element 140 is configured such that at least part of the excitation beam 121, 122 is at least partially reflected when incident on the optical element 140 and directed to the imaging lens 110.

The optical properties of the sample 10 allows optical imaging at the wavelengths of the illumination source 120. Upon excitation by the excitation beam 121, 122, the sample 10 may emit light depending on the mode of detection or the detection schemes. For example, the sample 10 may emit light via fluorescence, Raman scattering and Rayleigh scattering, among others. Each of these schemes may require a different configuration of the illumination source 120, the detector 130 and the optical element 140.

The optical element 140 is configured to provide an optical path for the light collected from the sample 10 via the imaging lens 110 towards the detector 130, separated from the optical path for the excitation beam 121, 122. The examples of the optical element 140 may include a beam splitter, a polarisation beam splitter, a dichroic mirror and a polychroic mirror although the optical element 140 is not limited to these examples.

In some implementations, when the sample 10 includes fluorescent molecules, the optical element 140 may be configured as a dichroic or a polychroic, which is configured to reflect the light at the wavelength of the excitation beam 121, 122 incident on the optical element 140 and transmit the light at at least one of the wavelengths of the fluorescence light emitted from the sample 10. The fluorescence light collected by the imaging lens 110 may arrive at the detector 130 after being transmitted at the optical element 140.

In some implementations, when the sample 10 is to be detected via scattering, the optical element 140 may be configured as a beam splitter or a polarisation beam splitter at the wavelength of the excitation beam 121, 122 and of the scattered light from the sample 10. Both the reflected excitation beam 121, 122 and the scattered light may reach the detector 130 after being transmitted at the optical element 140.

The examples of the imaging lens 110 includes an oil immersion objective lens, an air objective lens, aspheric lens, and an achromatic lens although the imaging lens 110 is not limited to these examples. The imaging lens 110 may be configured to provide a tight focusing of the excitation beam 121, 122 such as a diffraction-limited spot, and simultaneously to provide an efficient collection of the emission from the sample 10.

In some implementations, the position of the sample 10 may be adjusted along the direction of the incoming excitation beam 121, 122 along the z-direction in FIG. 1 such that a part or a portion of the sample 10 is near a focal plane 111 of the imaging lens 110 within the focal depth of the imaging lens 110 or equivalently within the focal volume of the imaging lens 110. That part of the sample 10 will be referred to be "at the focus" or "at the focal plane" of the imaging lens 110.

The extent of the sample 10 in the z-direction may exceed the focal depth of the imaging lens 110. In this case optical sectioning can be performed, by efficiently collecting signals from the focal plane 111 while suppressing the background signals from the out-of-focus plane 113. After obtaining a z-sectioned image, an optical sectioning image or an optically sectioned image, which is a planar image on the xy-plane within the focal depth of the imaging lens 110, the z-position of the sample 10 may be adjusted to obtain further z-sectioned image, eventually to construct a three dimensional optical image of the sample 10.

In some implementations, the illumination source 120 may be arranged such that the excitation beam 121, upon entering the imaging lens 110, is at the focus of the imaging lens 110.

For example, the excitation beam 121 can be sent into the imaging lens 110 substantially collimated such that the excitation beam 121 is focused at the focal plane in or at the focus of the imaging lens 110. In this case, the width of the excitation beam 121, in the xy-plane, is minimized near the sample 10 or at the focal plane 111. This mode of illumination will be referred to as the confocal illumination in the rest of the specification.

In some implementations, the illumination source 120 may be arranged such that the excitation beam 122 is focused at or near a back-focal plane 112 of the imaging lens 110 and upon entering the imaging lens 110, illuminates the sample 10 such that a relatively large area, in xy-plane, is illuminated simultaneously. In this case, the excitation beam 122 is not focused at the focal plane 111 of the imaging lens 110. This mode of illumination will be referred to as the wide-field illumination in this specification.

In some implementations, the wide-field illumination may be used in combination with the spatial light modulator 150 such that a plurality of focused illuminations or a focused illumination with an arbitrary structure in the xy-plane can be achieved at the focal plane 111. For example, with the use of the spatial light modulator 150, the illumination beam 122 may be arranged to be a plurality of focused spots or an array of line foci at the focal plane 150. In this case, the spatial light modulator 150 may be positioned such that the plane of the spatial light modulator 150 from which the excitation beam 122 is reflected is imaged at the focal plane 111.

The spatial light modulator 150 can be any optical element capable of imposing a spatially varying modulation to the transverse mode of the excitation beam 122. The examples of the spatial light modulator 150 may include a mask pattern mounted on a translation stage, a liquid crystal device, and a digital micromirror device (DMD), although the spatial light modulator 150 is not limited to these examples.

The portion of the sample 10 at the focus of the imaging lens 110 or within the focal volume of the imaging lens 110 is optically imaged onto the detector 130 as shown in FIG. 1.

The portion of the sample 10 which is out of focus of the imaging lens 110 or outside the focal volume of the imaging lens 110, for example at an out-of-focus plane 113 is not imaged onto the detector 130. FIG. 1 shows that the signal from the portion of the sample 10 at the out-of-focus plan 113 is imaged at a plane displaced from the detection plane of the detector 130 and that the signals from the out-of-focus plane 113 is displaced from the optical axis and occupies a wider area on the detector 130 as it impinges on the detector 130.

It is understood that additional optics for imaging may be introduced as necessary in addition to the components described in FIG. 1. For example, when the imaging lens 110 is infinity corrected, a tube lens is included either within the detector 130 or in the beam path between the optical element 140 and the detector such that the sample interface 150 and the sample 10 are optically imaged on the detector 130.

In some implementations, the detector 130 may be a single pixel detector such as an avalanche photodiode (APD), a photomultiplier tube (PMT) or a superconducting nanowire single-photon detector (SNSPD). All of the light collected by the imaging lens 110 and transmitted to the detector 130 may be detected with a single active area of the detector 130. This type of detector may be used with the confocal illumination where the excitation beam 121 is tightly focused on the sample 10. In this case, the portion of the sample 10 at the out-of-focus plane 113 leads to a signal with a smaller intensity than the signal of the portion of the sample at the focal plane 111 because the area of the signal at the plane of the detector 130 is larger than the active area of the detector 130.

In some implementations, the detector 130 may be a multi-pixel detector or a multi-array detector such as a CCD, an EMCCD, and a sCMOS. This type of detector may be used with the wide-field illumination where the excitation beam 122 is illuminated on sample 10 over a wide area and the collected light over the illuminated area is optically imaged onto the detector 130 over a plurality of pixels. In this case, the portion of the sample 10 at the out-of-focus plane 113 leads to a signal distributed over a larger number of pixels and displaced from the optical axis than the signal of the portion of the sample at the focal plane 111. In this case, the portion of the sample 10 at the out-of-focus plane 113 leads to a signal with a smaller intensity at a given pixel of the detector 130 than the signal of the portion of the sample at the focal plane 111.

Figure 2:
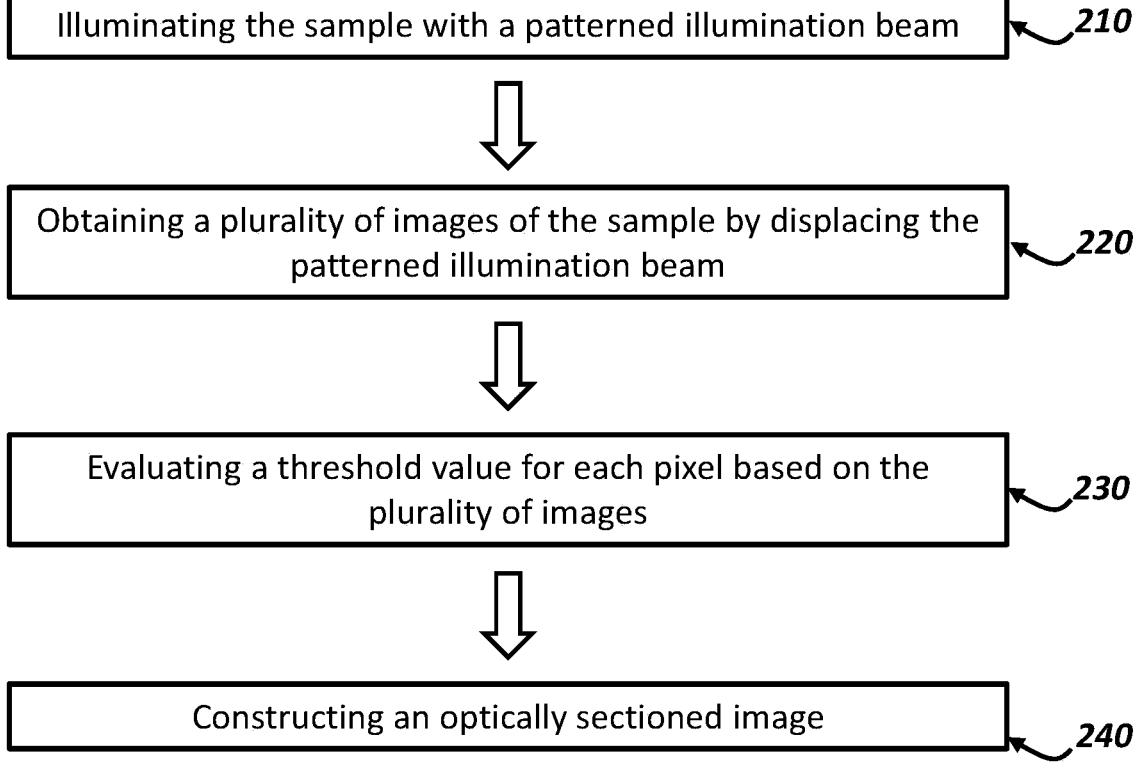
FIG. 2 flowchart for a method for obtaining an optically-sectioned image of a sample.

FIG. 2 flowchart for a method for obtaining an optically-sectioned image of a sample.

At step 210, the sample 10 is illuminated by a patterned illumination beam 121, 122.

For obtaining an image, the patterned illumination illuminates a predetermined fraction of the area of the sample to be imaged on the detector 130. Any pattern of the illumination beam 121, 122 on the xy-plane at the focal plane 111 may be used as long as by repeating the illumination at one or more of the translated lateral positions of the patterned illumination beam 121, 122 covers the portion of the sample to be imaged on the detector 130.

As will be discussed in the next step, a plurality of images will be obtained by displacing the patterned illumination beam 121, 122. In one of the images of the plurality of images, the patterned illumination beam 121, 122 covers a predetermined fraction of the area of the sample to be imaged on the detector 130.

The patterned illumination beam 121, 122 is focused at the focal plane 111 such that the focal depth of the patterned illumination beam 121, 122 provides a varying degree of illumination of the sample 10 along the z-axis. The intensity is maximized at the focal plane 111. This is in contrast to some of the conventional optical sectioning methods with patterned illumination.

In some implementations, the illumination beam 121 may be in the form of the confocal illumination. In this case, to obtain one of the plurality of images, the illumination beam 121 may be patterned by selectively or periodically modulating the amplitude of the illumination beam 121 while the focused spot of the illumination beam 121 at the focal plane 111 is raster scanned on one z-section on the sample 10 on the xy-plane. The amplitude modulation of the illumination beam 121 may be achieved by the spatial light modulator 150 or additional amplitude modulator (not shown) such as an acousto-optic modulator placed in the beam path of the illumination beam 121.

At step 220, a plurality of the image of the sample 10 are obtained by displacing the patterned illumination beam 121, 122.

After obtaining one image or one frame, the patterned illumination beam 121, 122 may be shifted or displaced laterally to a new position to obtain another image or another frame, such that the patterned illumination beam 121, 122 illuminates a part of the sample 10 which was not illuminated previously.

The plurality of images or frames are obtained by repeating translationally moving the patterned illumination beam 121, 122.

In some implementations, the illumination beam 122 may be in the form of an array of line foci at the focal plane 111 using the spatial light modulator 150.

In some implementations, the illumination beam 122 may be in the form of an array of focused spots using the spatial light modulator 150.

In some implementations, the illumination beam 122 may be arranged to be an arbitrary combination of lined focus and focused spots on the focal plane 111. Images or frames are recorded at each position of the patterned illumination beam 121, 122 by collecting emission from the sample 10 via the imaging lens 110 and by detecting the signals on the detector 130.

In some implementations, by shifting the patterned illumination beam 121, 122 for a predetermined number of times, the whole of the area of the sample 10 which is imaged on the detector 130 may be covered.

In some implementations, when a single pixel detector 130 is used, each image or frame is obtained by shifting the sample 10 translationally along the xy-plane.

The collection or collation of the plurality of images obtained in this step 220 will be also referred to as image stack.

The method 200 is not limited to line scanning or raster scanning. Any pattern modulation to cover all the areas of the field of view in one scan can be employed. A non-periodic random pattern can also be used.

For each pixel (x,y) of image or frame j, where j runs from 1 to n, where n is the number of frames obtained per image stack.

Since the patterned illumination beam 121, 122 is arranged such that the intensity of the illumination varies for each image or each frame j. The portion of the sample 100 which will be imaged to each pixel (x,y) of image j, has a lateral extent or a dimension on xy-plane, which is smaller compared to the period or the interval of the distance between each of the illuminating spots or lines or any other illuminated areas of the patterned illumination 121, 122 at the sample plane.

In some implementations, the illumination beam 122 may be in the form of an array of line foci at the focal plane 111 and two sets of orthogonal line data may be obtained by arranging two sets the line foci which are orthogonal to each other in the xy-plane.

In some implementations, before computing an optically-sectioned image as will be discussed in the following, each image of the image stack may be corrected to reduce image artifacts in the optically-sectioned image by accounting for imperfections in the illumination and imaging system. From an image $N_i$ from the image stack a corrected image $N_{i,c}$ may be obtained by $N_{i,c} = N_i/c$, where c is a correction factor $c = median$ $(N_i/N_m)$ where $N_m$ is either the median image, or the median image passed through a low pass filter, or the mean image, or the mean image passed through a low pass filter.

At step 230, a threshold is evaluated for each pixel based on the plurality of images.

The threshold value t takes into account the signal values of all of the acquired plurality of images and a desired degree of z-sectioning.

The in-focus light is determined by considering the n pixel values p_j(x,y).

The pixel values $p_j(x,y)$ shows a distribution within a given image stack, which contains the information of the ratio of the signal from the focal volume at the focal plane 111, the signal of interest, to the signal outside the focal volume at the out-of-focus plane 113, the background.

For example, a pixel mainly containing signals from within the focal volume and a pixel mainly containing signals from outside the focal volume may result in different distributions of pixel values with different statistical properties: Pixels which correspond to in-focus objects on the sample will have a signal level that changes quickly as the pattern is scanned and with a larger intensity difference, whereas pixels corresponding to out-of focus objects will have a signal level that changes slowly with a lower amplitude. As a result, when the signal level of a pixel corresponding to an in-focus object is plotted against the frame index, the graph will have a narrow peak, whereas the signal from a pixel looking at an out-of-focus object will have a broad peak.

The signal values which will be included in the optically-sectioned image is referred to in this specification as 'in-focus signal,' The signal values which will not be included in the optically-sectioned image is referred to here as 'out-of-focus signal.'

A threshold can be used to determine the in-focus light for each pixel (x,y). The in-focus signal is estimated as the sum of the difference between each of the n pixel values $p_j(x,y)$ and the threshold. If the sum results in a negative number for any pixel (x, y), all pixels with negative sum may be set to zero, as in adjusting the contrast of the image in a conventional image viewing program The sum of the resulting in-focus signal across the image stack is intensity value used for the final optically sectioned image $f_t(x,y)$.

$f_t(x,y)$: resulting optically sectioned image (where t is the threshold value). The choice of threshold value t determines the degree of optical sectioning.

$f_t(x,y)=(p_j(x,y)-t)$ is summed over all j.

The threshold value t is determined for each pixel.

In some implementations, the threshold value t for each pixel is given by the product of the evaluation of a background function $I_{bg}(x,y)$, or a threshold, and a single constant sectioning factor CSF. By varying the constant sectioning factor CSF, the degree of sectioning in the resulting optically sectioned image can be controlled. The background function $I_{bg}(x,y)$ corresponds to a statistical method applied consistently to all of the pixels. The background function $I_{bg}(x,y)$ is evaluated for each pixel. The single constant sectioning factor is common to all pixels and varied for different degree of sectioning.

In this case, the intensity of the resulting optically sectioned image is given by $$I(x, y) = \sum_{j=1}^{n}\{p_j(x, y) - I_{bg}(x, y) * CSF\}$$

In some implementations, the resulting optically sectioned image may be constructed by any function that receives $p_j(x,y)$, $I_{bg}(x,y)$ and the constant sectioning factor CSF. In particular, the function to construct the optically sectioned image may be defined such that the constant sectioning factor CSF cannot be factored out. For example, the intensity of the resulting optically sectioned image may be alternatively given by $$I(x, y) = \sum_{j=1}^{n}\{p_j(x, y)/I_{bg}(x, y)^{CSF}\}$$

or $$I(x, y) = \sum_{j=1}^{n}\{p_j(x, y)/(I_{bg}(x, y) * CSF + 1)\}$$

In general, the resulting optically sectioned image can be constructed by any function that receives $p_j(x,y)$, $I_{bg}(x,y)$ and the CSF, and may have the property that CSF cannot be factored out of the function.

Some examples of the background function $I_{bg}(x,y)$ include the following:
(1) $I_{bg}(x,y)$=median over 'j' of {$p_j(x,y)$}
(2) $I_{bg}(x,y)$=median over 'j' of {$p_j(x,y)$} with subsequent Gaussian blurring over neighbouring pixel (i.e. blurring over 'x,y')
(3) $I_{bg}(x,y)$=mean over 'j' of {$p_j(x,y)$} with subsequent Gaussian blurring over neighbouring pixel (i.e. blurring over 'x,y')
(4) $I_{bg}(x,y)$=(mean over 'j' of {$p_j(x,y)$})—(standard deviation over 'j' of {$p_j(x,y)$})
(5) $I_{bg}(x,y)$=P-th percentile over 'j' of {$p_j(x,y)$}

The threshold value t, in particular the background function $I_{bg}(x,y)$ evaluated as above, may be sensitive to the distribution of the pixel values $p_j(x,y)$ of the frame stack.

In some implementations, the background function $I_{bg}(x,y)$ may be a statistical function whose output depends on the skewness of the distribution of the input data. The background function $I_{bg}(x,y)$, for example, can be determined as the median of the pixel values $p_j(x,y)$ which is sensitive to the skew of the distribution. By assigning more weight to the pixel j where the ratio of in-focus light to out-of-focus light is larger, an optically-sectioned image can be obtained.

In contrast, the mean only depends on the total sum and the number of elements and therefore not sensitive to the skewness and therefore may not provide any meaningful optical sectioning. For another example, background function $I_{bg}(x,y)$ may include any n-th order moment of the input data.

The out-of-focus signal is digitally selected from each pixel value to change the degree of optical sectioning. This is achieved by determining the constant sectioning factor CSF. The constant sectioning factor CSF is a value that determines the degree of optical sectioning of the overall image and is the same for all of the pixels.

Once the plurality of images are obtained to form the frame stack and the background function is evaluated for each pixel from the frame stack, the degree of optical sectioning can be continuously varied or continuously tuned by changing the constant sectioning factor CSF, such that different levels of optical sectioning can be obtained. Therefore, one set of scans can provide multiple images at different levels of optical sectioning. Furthermore, the continuous tuning of the optical sectioning independent of the pattern of the patterned illumination beam 121, 122.

At step 240, an optically-sectioned image is constructed.

As discussed above, the plurality of background subtracted images are summed to yield the optically sectioned image. In particular, at each pixel $f_r(x,y)=(p_j(x,y)-t)$ is summed over all j. The threshold value t is given by multiplying the background function $I_{bg}(x,y)$ and the constant sectioning factor CSF.

Figure 3A:
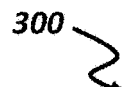
FIG. 3*a* is a schematic that illustrates constructing an optically sectioned image.
Figure 3B:
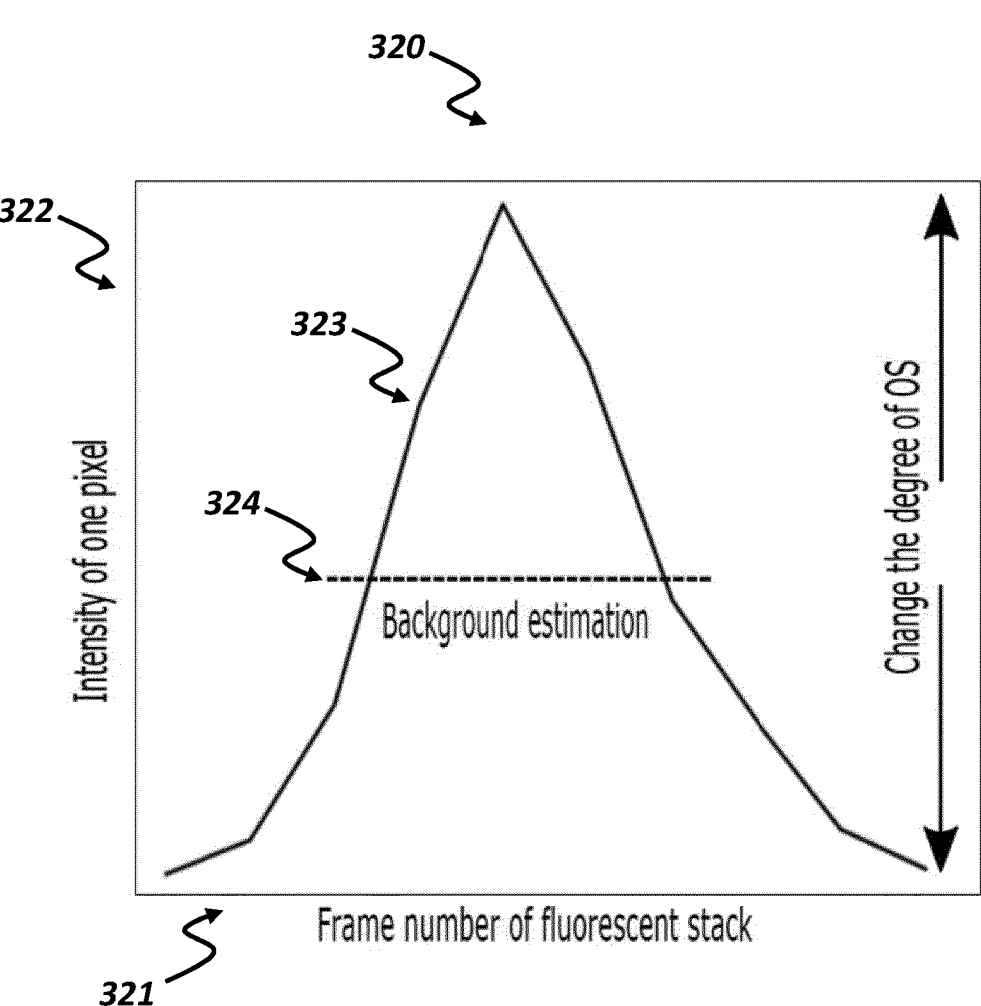
FIG. 3*b* shows a graph that illustrates constructing the optically-sectioned image.

This step for constructing an optically-sectioned image with the median as the threshold, which corresponds to the cases (1) and (5) when P=50 will be exemplified in detail in FIGS. 3a and 3b.

FIG. 3a is a schematic that illustrates constructing an optically sectioned image.

FIG. 3a shows an image stack 300 obtained at step 220, which includes 10 individual images or individual frames 300-1, 300-2, 300-3, 300-4, 300-5, 300-6, 300-7, 300-8, 300-9, 300-10. The individual images 300-1, 300-2, 300-3, 300-4, 300-5, 300-6, 300-7, 300-8, 300-9, 300-10 are obtained by illuminating the sample 10 with an array of line foci 311, as illustrated in an illumination pattern image 310.

In the example of FIG. 3a, as shown in the illumination pattern image 310, the patterned illumination beam 121, 122 at the focal plane 111 comprises a linear, parallel array of line foci 311, which extends from the positive y-direction to the positive x-direction on the xy-plane at the focal plane 111, with a negative slope in the xy-plane as shown in FIG. 3a. The line foci 311 are regularly spaced and parallel to each other.

Each individual image 300-1, 300-2, 300-3, 300-4, 300-5, 300-6, 300-7, 300-8, 300-9, 300-10 is obtained by translationally moving the array of line foci 311 by 10 times, thereby producing 10 images. For each image, the patterned illumination beam 121, 122 at the focal plane 111 is moved roughly one tenth of the distance between two adjacent line foci 311 such that displacing the patterned illumination beam 121, 122 by 11 times correspond to the original pattern of the illumination beam 121, 122.

In the example of FIG. 3a, the detector 130 is a multi-pixel detector. In the rest of the description, constructing the optically section image will be explained assuming that the detector 130 is a multi-pixel detector such as a CCD. However, the same operating principle applies to the use of a single pixel detector such as a photomultiplier tube (PMT) or an avalanche photodiode (APD), with each pixel of the multi-pixel detector taken to be the single pixel detector.

For a given pixel 301, marked in FIG. 3a as a white square on each image 300-1, 300-2, 300-3, 300-4, 300-5, 300-6, 300-7, 300-8, 300-9, 300-10, corresponds to one pixel of the detector 130. This pixel 301 is imaged via the imaging lens 110 to a portion of the sample 10 at the focal plane 111.

The lateral extent of that portion of the sample in the xy-plane imaged to the pixel 301 is smaller or comparable to or smaller than the periodicity of the line foci 311, or the distance between two adjacent line foci 311. Therefore, as the patterned illumination beam 121, 122 is displaced laterally parallel to the xy-plane, the intensity of the illumination beam 121, 122 on the portion of the sample corresponding to the pixel 310 changes.

A signal graph 320 shows the signals collected and recorded at the pixel 301. An x-axis 321 of the signal graph 320 represents the frame number, where each frame contains the individual images 300-1, 300-2, 300-3, 300-4, 300-5, 300-6, 300-7, 300-8, 300-9, 300-10, thereby having 10 distinct points. A y-axis 322 of the signal graph 320 represents the signal value, which corresponds to the intensity of the signal received at the pixel 301 of the detector 130. As discussed above, since the intensity of the illumination beam

121, 122 varies for each frame, the signal generated from the portion of the sample imaged onto the pixel 301 varies accordingly. The relation between the intensity of the signal and the intensity of the illumination beam 121, 122 depends on the mode of optical imaging and the specific sample. However, in general, it is understood that the larger the intensity of the illumination, the larger the signal intensity or the pixel value at the pixel 301. The unit of the y-axis 322 representing the intensity of the signal is specific to the type of the detector 130. The examples of the unit include photoelectron counts, photon counts, voltage or photocurrent, although the unit is not limited to these examples.

In the example of FIG. 3a, the signal graph 320 shows that at frame 5, the signal value or the pixel value is maximised. This means that at the position of the patterned illumination beam 121, 122 corresponding to frame 5, one of the line foci 311 was nearest to the portion of the sample 10 imaged at the pixel 301. The signal value at each frame includes the signal generated from the portion of the sample 10 within the focal volume at the focal plane 111, which is a signal of interest and also the signal generated from a portion of the sample outside the focal volume at the out-of-focus plane 113, which is a background. Among the 10 frames plotted in the signal graph 320, at frame 5, the ratio of the signal of interest to the background is also maximised. As illustrated in FIG. 1, the background signal from the out-of-focus plane 113, imaged at a plane displaced from the detector 130, is distributed over a larger number of pixels of the detector 130, whereas the signal of interest, from the focus plane 111, is concentrated on one single pixel of the detector 130.

FIG. 3b shows a graph that illustrates constructing the optically-sectioned image.

By connecting the signal values in the signal graph 320, a signal curve 323 can be obtained for every pixel, for example the pixel 301, of the image stack 300.

As discussed in step 230, in order to determine the in-focus-signal, a threshold value 324, represented as a horizontal line in FIG. 3b, is set. In the example of FIG. 3b, the threshold value is set to be the median of the 10 pixel values of the pixel 301 of the image stack 300, and the constant sectioning factor CSF is set to be 1.

As discussed in step 230, to evaluate the in-focus signal, the threshold value 324 is subtracted from each of the pixel values.

A degree of optical sectioning of the optically-sectioned image can be adjusted by correspondingly adjusting the threshold value 324. For example, a constant sectioning factor CSF can be multiplied to the initial threshold value 324, for example, the median of the pixel values, to adjust the threshold value 324. For example, when the constant sectioning factor CSF is larger than 1, the value subtracted from the pixel value is larger, so the final in-focus signal value is smaller than the case when the threshold value 324 is the initial threshold value 324, which corresponds to a higher degree of sectioning.

The level of sectioning can be changed from an open aperture equivalent configuration to a closed aperture equivalent configuration step-by-step in small degrees.

Figure 3C:
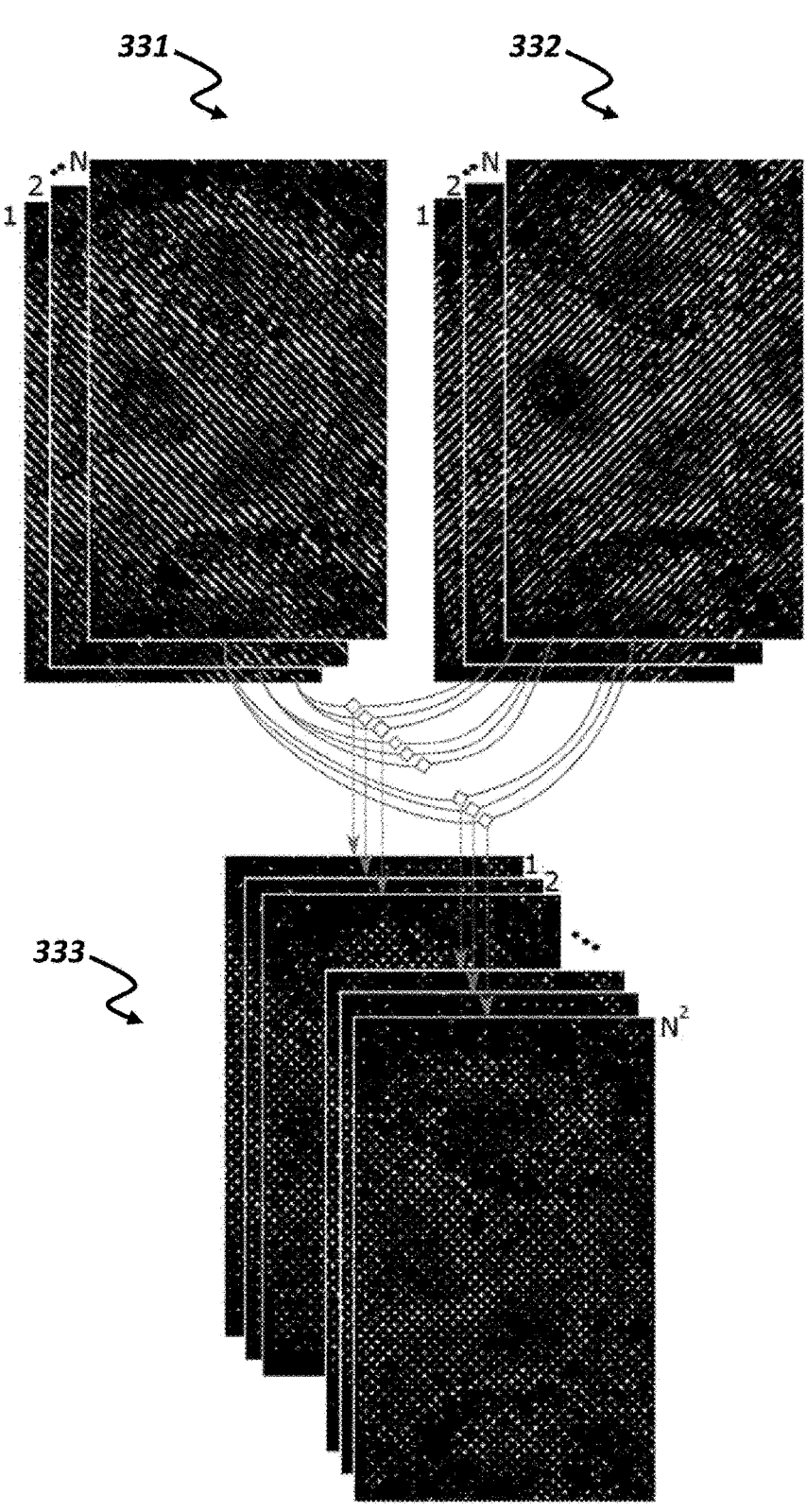
FIG. 3*c* is a schematic that illustrates constructing an image stack from two sets of images.

FIG. 3c is a schematic that illustrates constructing an image stack from two sets of images.

Instead of directly computing an optically-sectioned image as discussed in steps 230 and 240, the two sets of the plurality of images 331, 332 obtained can be processed to yield a stack of sparse multi-focal images 333. This can be achieved, for example, by performing pairwise minimum-intensity-projection between the two sets of orthogonal line data 331, 332. For another example, a stack of sparse multi-focal images 333 can be obtained by performing $M_k = N_{i,1} + N_{j,2} - |N_{i,1} - N_{j,2}|$ where $N_{i,1}$ and $N_{j,2}$ are images of the two sets of orthogonal line data 331, 332 and $M_k$ is one image of the multi-focal image stack. The method of forming the stack of multi-focal images 333 is not limited to these examples. The stack of multi-focal images 333 may be utilised for further imaging resolution enhancement algorithms such as Image Scanning Microscopy (ISM), Multifocal-excited, Pinholed, Scaled and Summed (MPSS), Multifocal Structured Illumination Microscopy (MSIM), Structured Illumination Microscopy (SIM), super resolution microscopy and deconvolution microscopy.

Figure 4A:
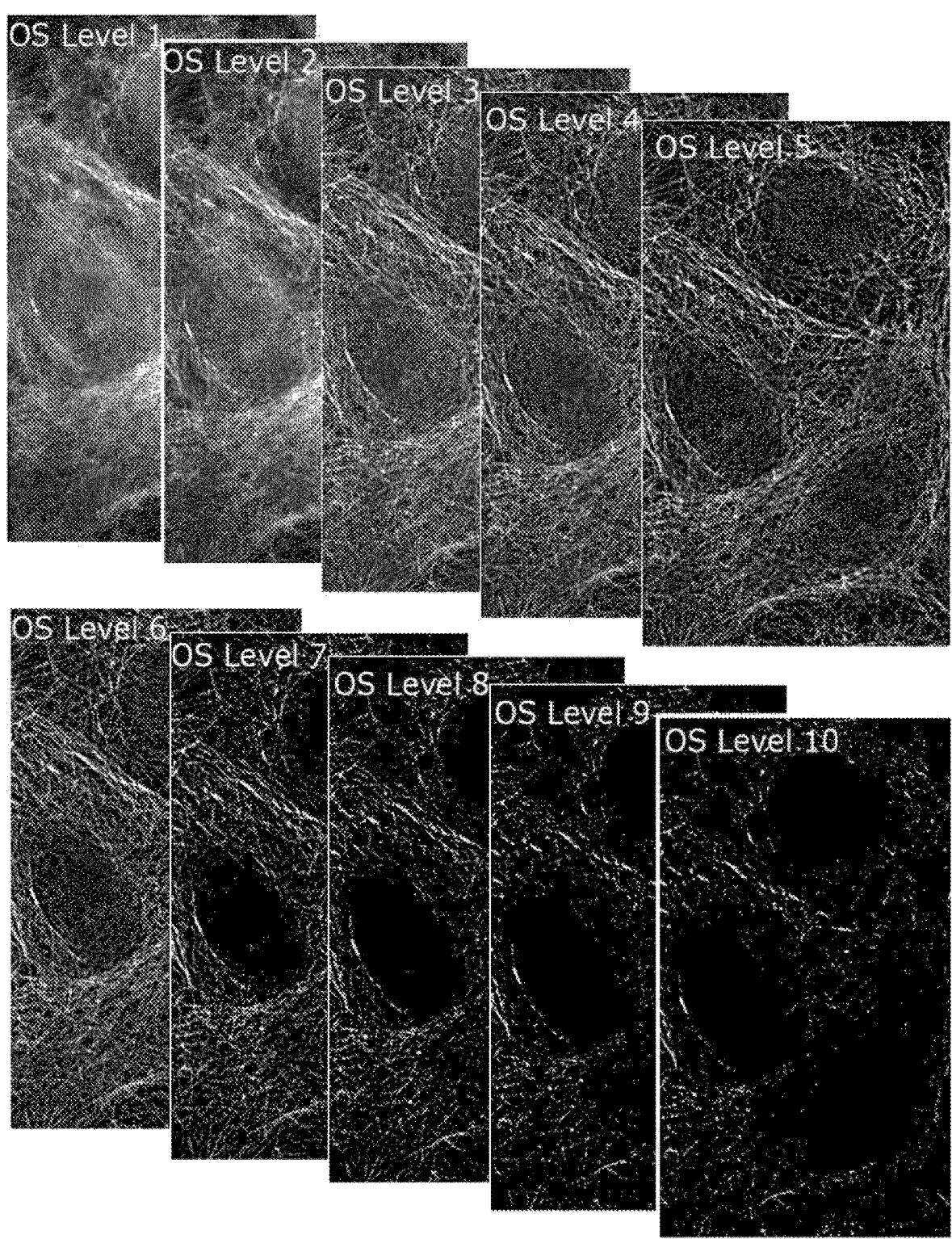
FIG. 4 shows optically sectioned images with varying degrees of optical sectioning.

FIG. 4a shows optically sectioned images with varying degrees of optical sectioning.

Optically sectioned images of various degrees can be accessed from the frame stack obtained in one set of scanning as described in FIGS. 2 and 3. That is, the same raw image data can be processed again to get an optically sectioned image of a different degree. FIG. 4a shows an example of an image starting from an open pinhole equivalent configuration (OS level 1) and gradually closing the size of the pinhole in 10 steps to a sectioning (OS level 10) maximised which corresponds to higher x, y, z resolution and smaller depth of field. Fixed Cos-7 cells were imaged via fluorescence with 561 nm laser excitation and 660-700 nm filters. The imaging lens 110 used was a 100×, 1.39 NA objective lens. The detector 130 used was sCMOS camera. For each image, the camera exposure time was 33 msec. With 2×2 pixel binning, each effective pixel is 0.117 microns in size and the field-of-view of the image is 50×80 microns.

Figure 4B:
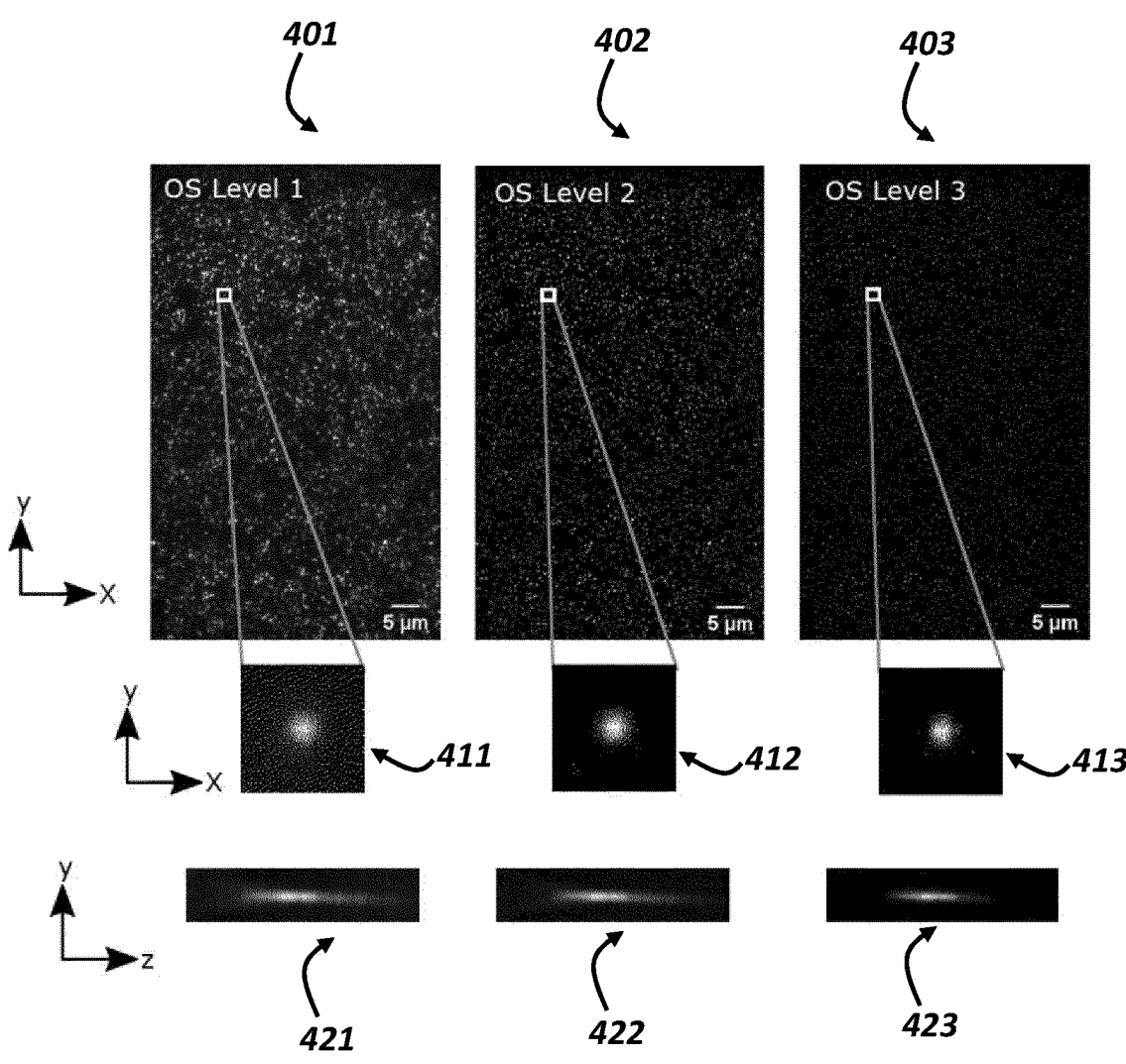

FIG. 4b shows an example of improving the image resolution with a higher degree of optical sectioning.

Fluorescent beads (Tetraspeck) with 0.1 micron diameter were imaged with 561 nm laser excitation as the illumination source 120 and optical filters to collect fluorescence signals 660-700 nm range is placed in the detection path. The imaging lens 110 is a 100×, 1.39 NA oil immersion objective lens. The detector 130 is a sCMOS camera with 33 msec camera exposure time and 2×2 pixel binning. Each binned pixel corresponds to 0.117 microns in the x-direction and in the y-direction.

Three images in the first row, a first image 401, a second image 402, a third image 403 were obtained with three different levels of optical sectioning (OS Level 1, OS Level 2, OS Level 3). The field-of-view of the images is 50 microns×80 microns in the xy-plane which is parallel to the sample plane.

Three images in the second row, 411, 412, 413 are part of the first to third images 401, 402, 403, respectively, which are images of a single fluorescent bead with a field-of view of 1.3 microns×1.3 microns in the xy-plane. The images in the second row 411, 412, 413 shows that the lateral resolution in the xy-plane improves with a higher degree of sectioning. For example, the image of the bead 413 corresponding to the OS Level 3 exhibits a smaller lateral size than the image of the bead 412 corresponding to the OS Level 2.

Three images in the third row, 421, 422, 423 are images obtained from a single fluorescent bead in the yz-plane, by repeatedly obtaining images while varying the position of the focal plane in the z-direction, which is the axial direction of the imaging lens 110. The field of view of the images 421, 422, 423 is 1.3 microns×2 microns in the yz-plane. Each pixel is 0.117 microns in the y-direction and 40 nanometers in the z-direction. 50 images are taken with 40 nanometer steps in the z-direction. The images in the third row 421, 422, 423 shows that the axial resolution in the z-direction improves with a higher degree of sectioning. For example, the image of the bead 423 corresponding to the OS Level 3 exhibits a smaller axial extent than the image of the bead 422 corresponding to the OS Level 2.

The data presented in FIGS. 4a and 4b demonstrate that a method and a device described herein are capable of obtaining different levels of optical sectioning in one scan and without the prior knowledge of the pattern of the illumination beam 121, 122.

Figure 5A:
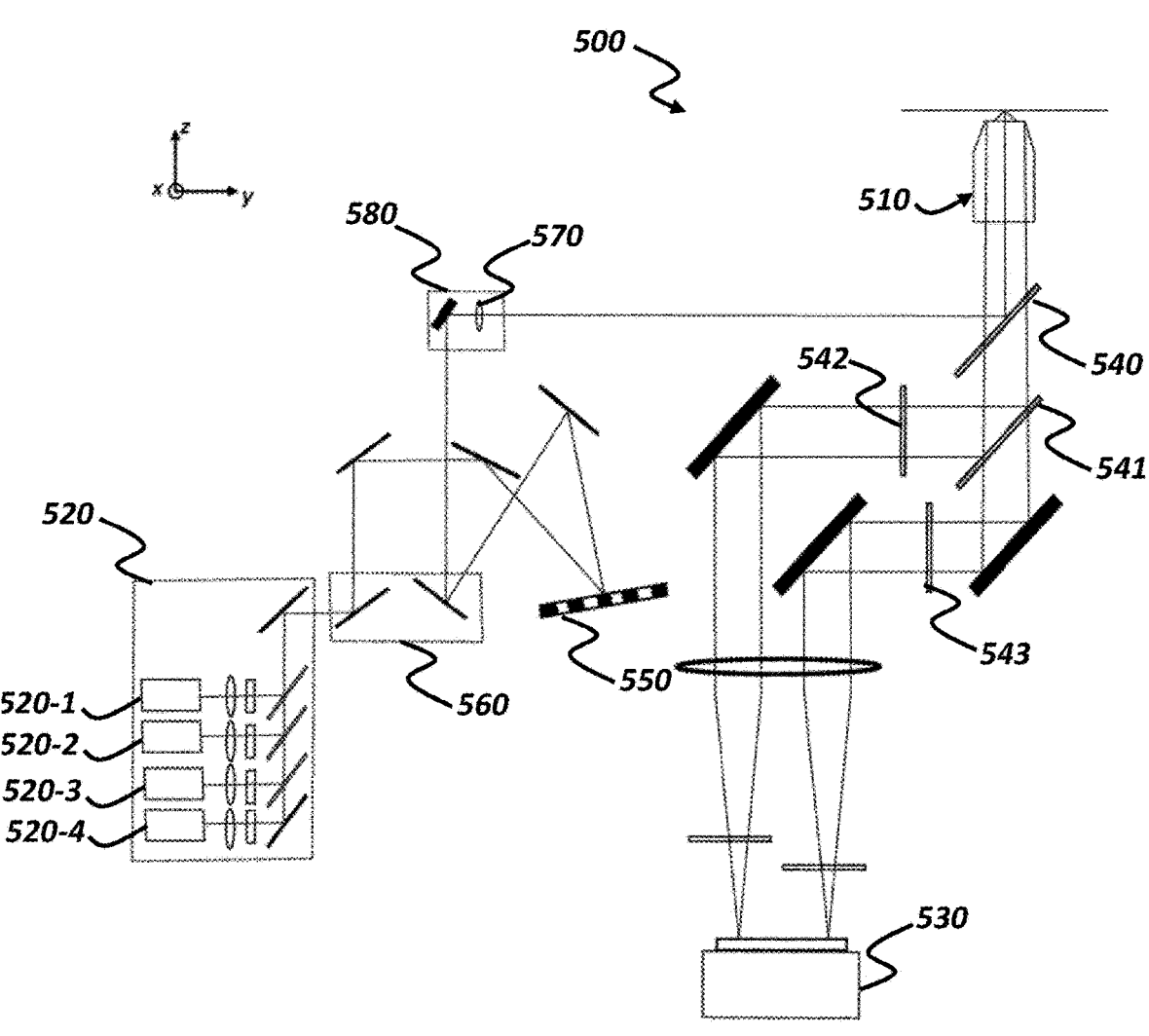
FIGS. 5*a* and 5*b* are schematics that illustrate an exemplary embodiment of an optical imaging system combining a structured illumination and a wide-field illumination.
Figure 5B:
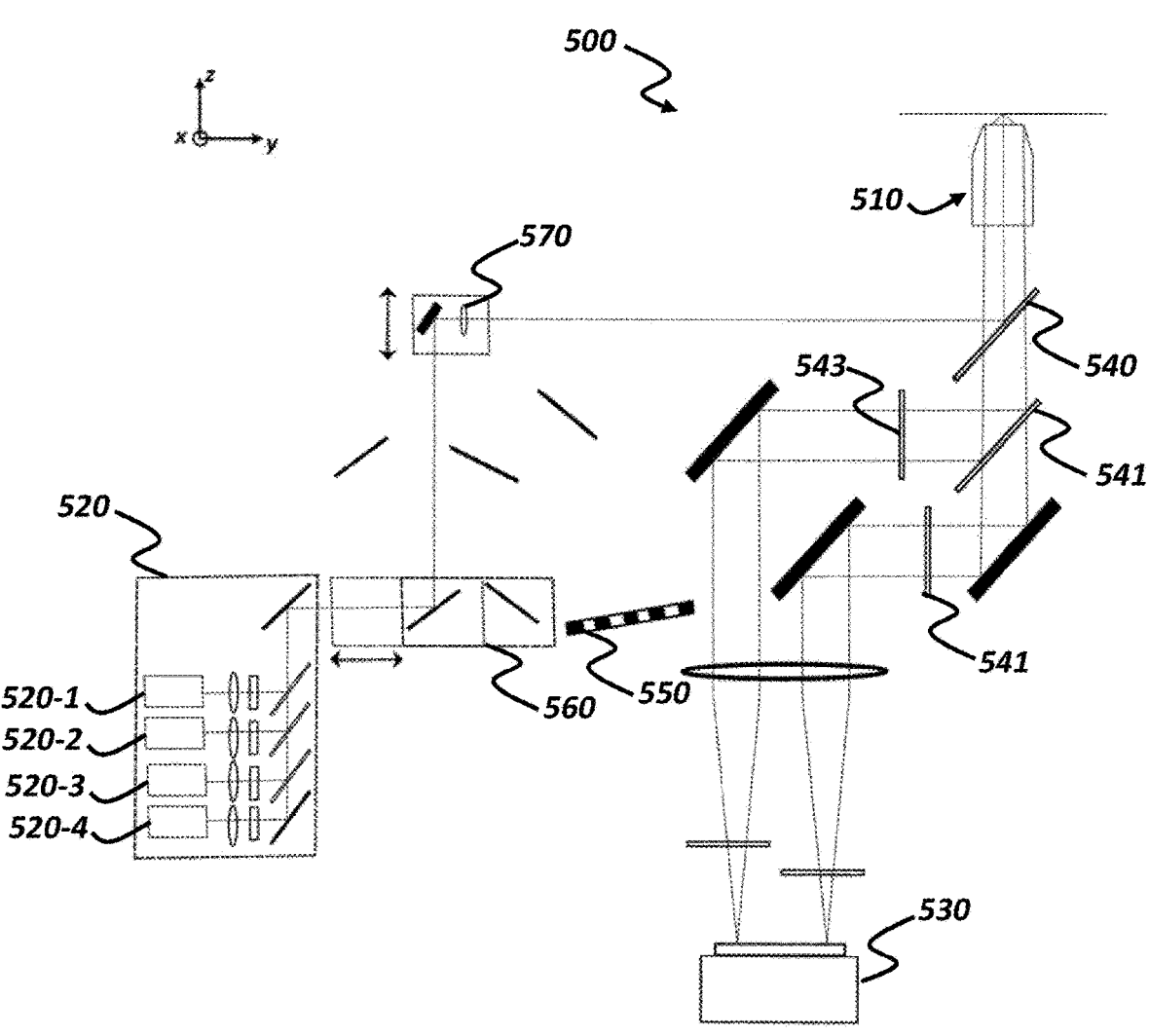

FIGS. 5a and 5b are schematics that illustrate an exemplary embodiment of an optical imaging system combining a structured illumination and a wide-field illumination.

An optical imaging system 500 includes an integrated combination of the optical imaging system described in FIG. 1 and a compact microscope as described in U.S. Pat. No. 10,330,904 B2.

The optical imaging system 500 includes an imaging lens 510, an illumination source 520, a detector 530, an optical element 540 and a spatial light modulator 550 as described in FIG. 1. In particular, the optical imaging system 500 can be operated in a mode for a structured illumination or in a mode for a standard wide-field illumination.

The optical imaging system 500 can be switched between the two modes of illumination by moving two mirrors on a slider 560, while keeping the rest of optics in place. FIG. 5a shows the optical imaging system 500 in the structured illumination mode and FIG. 5b shows the optical imaging system 500 in the standard wide-field illumination mode.

Both modes share the illumination source 520. The illumination light launched from the illumination source 520 is a combination of one or more beams emitted from optical fibre-coupled lasers 520-1, 520-2, 520-3, 520-4. For example, lasers with four different wavelengths, 405 nm, 488 nm, 561 nm, 635 nm, can be collimated by lenses and combined into the same beam path by dichroic mirrors.

In the structured illumination mode as shown in FIG. 5a, the slider 560 is positioned such that the collimated beam launched from the illumination source 520 impinges onto the spatial light modulator 550, for example a digital-micromirror-device (DMD). The plane of the spatial light modulator 550 from is imaged onto the focal plane of the imaging lens 510 by additional optics between the imaging lens 510 and the spatial light modulator 550 with a demagnification of about 55. For example, the FIG. 5a shows that an additional lens 570 is placed for this purpose.

In the wide-field mode as shown in FIG. 5b, the slider 560 is positioned such that the collimated beam launched by the illumination source 520 is guided to the lens 570 which focuses the beam onto the back-focal plane of the imaging lens 510. The lens 570 and one mirror are on a second slider 580, that is configured to displace the illumination beam parallel to the optical axis of the imaging lens 510 to achieve an angled illumination, such as objective-based HILO (Highly Inclined and Laminated Optical sheet) illumination, and objective-based TIRF (Total Internal Reflection Fluorescence) illumination.

The detection channels are identical for both illumination modes. The optical element 540 in the examples of FIGS. 5a and 5b is a dichroic mirror, configured to reflect the excitation beam launched by the illumination source 520 towards the imaging lens 510 and transmits the fluorescence of interest towards the detector 530. The detection path is split into two paths by a long-pass mirror 541, for example, cut-off wavelength at 620 nm. The light reflected at the long-pass mirror 541 passes through an optical filter 542, for example, transmission filter for 505-545 nm and 575-620 nm, and is imaged onto a camera by a lens. The light transmitted at the long-pass mirror 541 passes through an optical filter 543, for example, transmission filter for 660-710 nm, and is imaged onto another part of the detector 530, for example, a sCMOS device, a CCD or an EMCCD.

The optical imaging devices 100, 500 and the method 200 described herein provide the following advantages:

The method disclosed in this specification requires acquiring image data only once with one single scan of the specimen, comprising multiple positions of the patterned illumination beam 121, 122, of the specimen. A complete range of optical sectioning can be obtained.

The method disclosed in this specification does not require any type of lattice fitting or pre-calibration of the imaging device.

The degree of optical sectioning can be changed quickly by changing the constant sectioning factor CSF, without having to rescan the sample or change hardware configurations like conventional methods, avoiding any sample degradation caused by rescanning such as photobleaching.

The level or the degree of sectioning can be tuned continuously depending on the sample, independently of physical constraints.

The emission light collection efficiency is not compromised because optical sectioning is achieved without having a physical aperture in the optical pathway.

The speed of imaging or the number of patterns required to acquire an image can be adjusted by the user.

The user need not choose the level of optical sectioning or the associated parameters before and during the experiment.

The embodiments of the invention shown in the drawings and described hereinbefore are exemplary embodiments only and are not intended to limit the scope of the invention, which is defined by the claims hereafter. It is intended that any combination of non-mutually exclusive features described herein are within the scope of the present invention.

The invention claimed is:

1. A method for obtaining an optically-sectioned image of a sample based on a plurality of images of the sample, the method comprising constructing an optically-sectioned image by:

obtaining a plurality of signal values from the plurality of images, the plurality of signal values corresponding to the same pixel across the plurality of images;

evaluating a threshold value for the pixel based on the plurality of signal values and a desired degree of sectioning of the optically-sectioned image; and evaluating a pixel value by integrating a fraction of the plurality of signal values above the threshold value, wherein the plurality of images comprises optical images of the sample obtained by illuminating the sample with a focused patterned illumination beam at a plurality of lateral positions at a focal plane, wherein each image is obtained when the patterned illumination beam is at a respective one of the lateral positions, such that an intensity of the patterned illumination beam on a portion of the sample at the focal plane varies for each of the plurality of lateral positions.

2. The method of claim 1, wherein evaluating the threshold value for the pixel comprises:

providing a sectioning factor for determining the desired degree of sectioning of the optically-sectioned images;

wherein the threshold value for the pixel is evaluated as a function of the sectioning factor and a background function evaluated at the pixel; and wherein the fraction is evaluated by subtracting the threshold value from each of the plurality of the signal values or by dividing each of the plurality of the signal values by the threshold value.

3. The method of claim 2, wherein the threshold value for the pixel is a multiplication of the sectioning factor and the background function evaluated at the pixel.

4. The method of claim 2, wherein the background function is a statistical function whose output depends on a skewness of the distribution of input data; and wherein the background function is evaluated at the pixel by performing the statistical function on the plurality of the signal values.

5. The method of claim 2, wherein evaluating the background function at the pixel involves one of:

(1) calculating the median of the plurality of signal values for the pixel;

(2) calculating the median of the plurality of signal values for the pixel with subsequent Gaussian blurring over neighbouring pixels;

(3) calculating the mean of the plurality of signal values for the pixel;

(4) calculating the mean of the plurality of signal values for the pixel with subsequent Gaussian blurring over neighbouring pixels;

(5) calculating the mean of the plurality of signal values and subtracting the standard deviation for each signal value;

(6) determining the Pth percentile signal value for the pixel.

6. The method of claim 1, wherein the step of evaluating a pixel value comprises summing the difference between each of the signal values for that pixel and the threshold value, and setting the pixel value to zero if the sum produces a negative number.

7. The method of claim 1, the method comprising an imaging step involving:

providing the patterned illumination beam through an imaging lens such that the patterned illumination beam is focused at a focal plane of the imaging lens;

obtaining said plurality of images of the sample, wherein obtaining comprises providing the patterned illumination beam at the plurality of lateral positions on the focal plane and obtaining each image when the patterned illumination beam is at a respective one of the lateral positions, such that the intensity of the patterned illumination beam on the portion of the sample at the focal plane varies for each of the plurality of lateral positions, and detecting, using a detector, signals collected via the imaging lens.

8. The method of claim 7, wherein the patterned illumination beam is focused at the focal plane, and wherein the patterned illumination beam comprises a periodic pattern with a spatial period defined in at least one direction within the focal plane.

9. The method of claim 8, wherein the patterned illumination beam comprises a periodic array of line foci focused at the focal plane.

10. The method of claim 8, wherein the patterned illumination beam comprises an array of focused spots focused at the focal plane.

11. The method of claim 8, wherein the patterned illumination beam comprises a combination of line focus and focused spots focused at the focal plane.

12. A device for obtaining an optically-sectioned image of a sample, the device comprising:

an imaging lens;

an illumination source configured to provide a patterned illumination beam through the imaging lens such that the illumination beam is focused at a focal plane of the imaging lens;

a detector configured to detect signals collected from the sample via the imaging lens;

a control unit configured to:

obtain a plurality of images of the sample by providing the patterned illumination beam at a plurality of lateral positions on the focal plane, such that an intensity of the patterned illumination beam on a portion of the sample at the focal plane varies for each of the plurality of lateral positions; and construct the optically-sectioned image based on the plurality of images by:

obtaining a plurality of signal values from the plurality of images, the plurality of signal values corresponding to the same pixel across the plurality of images;

evaluating a threshold value for the pixel based on the plurality of signal values and a desired degree of sectioning of the optically-sectioned image; and evaluating a pixel value by integrating a fraction of the plurality of signal values above the threshold value.

13. The device of claim 12, wherein the control unit is further configured to:

receive a sectioning factor for determining the desired degree of sectioning of the optically-sectioned image;

evaluate the threshold value for the pixel as a function of the sectioning factor and a background function evaluated at the pixel; and evaluate the fraction by subtracting the threshold value from each of the plurality of the signal values or by dividing each of the plurality of the signal values by the threshold value.

14. The device of claim 13, wherein the threshold value for the pixel is a multiplication of the sectioning factor and the background function evaluated at the pixel.

15. The device of claim 13, further comprising:

a spatial modulator configured to provide the patterned illumination beam focused at the focal plane, and wherein the patterned illumination beam comprises a periodic pattern with a spatial period defined in at least one direction within the focal plane.

16. The device of claim 15, wherein the patterned illumination beam comprises a periodic array of line foci and/or an array of focused spots focused at the focal plane.

17. The device of claim 12, wherein the control unit is further configured to:

evaluate the background function at the pixel by performing a statistical function on the plurality of the signal values, wherein the statistical function receives a plurality of data values and outputs a value based on a skewness of the plurality of the data values.

18. The device of claim 17, wherein the statistical function outputs a median of the received plurality of data values such that the background function at the pixel is a median of the plurality of signal values.

19. The device of claim 12, wherein the detector is a single pixel detector.

20. The device of claim 12, wherein the detector is a multi-pixel detector.

\* \* \* \* \*